Patented Oct. 30, 1951

2,573,605

UNITED STATES PATENT OFFICE 2,573,605

TERTIARY AMINES AND METHODS FOR OBTAINING THE SAME

George Rieveschl, Jr., Grosse Pointe Woods, and William R. Coleman, Grosse Pointe, Mich., assignors to Parke, Davis & Company, Detroit, Mich., a corporation of Michigan No Drawing. Application December 2, 1946, Serial No. 713,461

7 Claims. (Cl. 260—570.9)

This invention relates to a new class of tertiary amines and to methods for obtaining the same. More particularly, the invention relates to substituted 1-naphthylmethyl β-haloalkyl amines and their acid addition salts. The free bases of the compounds of the present invention have the formula,

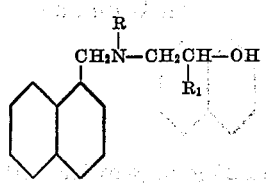

where R is a lower alkyl or alkenyl radical, $R_1$ is hydrogen or methyl and X is a chlorine or bromine atom.

It has been discovered that the compounds of the invention may be obtained by the action of a halogenating agent on a compound of the formula,

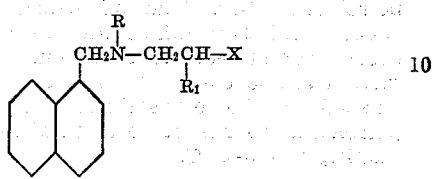

where R and $R_1$ have the same significance as given above. Some of the halogenating agents which may be used to effect this transformation are thionyl chloride, thionyl bromide, constant boiling hydrobromic acid, phosphorus oxychloride, phosphorus oxybromide, phosphorus trichloride, phosphorus tribromide, phosphorus pentachloride and the like. The reaction may be carried out by heating the two reactants for a short time in the presence or absence of a solvent. In some cases, such as when phosphorus oxychloride, constant boiling hydrobromic acid or thionyl chloride are used as the halogenating agent, an excess of the reagent serves both as a solvent and as a reactant. However, when halogenating agents such as phosphorus trichloride or thionyl bromide are used it is preferable to carry out the reaction in an inert organic solvent such as benzene, toluene or xylene.

The compounds of the present invention are powerful sympatholytic agents and because of this ability to block the pressor effect of epinephrine they are especially useful in the treatment of peripheral vascular diseases and neurogenic hypertension. These compounds also possess an extremely high degree of anti-histamine activity. They may be administered, preferably as the salts of the bases, either orally or intravenously. The usual intravenous dosage is about 10 to 20 mg. while the oral dosage is about 50 to 100 mg.

The invention is illustrated by the following examples.

*Example 1.—β-Chloroethyl methyl 1-naphthylmethyl amine*

$$CH_2N(CH_3)-CH_2CH_2Cl$$

21.5 g. of β-hydroxyethyl methyl 1-naphthyl methyl amine is dissolved in 150 cc. of benzene and the resulting solution added slowly with stirring to a refluxing solution of 13 cc. of thionyl chloride in 100 cc. of benzene. The reaction mixture is stirred and refluxed for three hours, cooled and the crystalline hydrochloride of β-chloroethyl methyl 1-naphthylmethyl amine removed by filtration. After two recrystallizations from isopropanol the purified hydrochloride salt melts at 198–9° C.

*Example 2.—β-Chloroethyl ethyl 1-naphthylmethyl amine*

$$CH_2N(CH_2CH_3)-CH_2CH_2Cl$$

A solution of 22.9 g. of β-hydroxyethyl ethyl 1-naphthylmethyl amine in 100 cc. of benzene is added slowly with stirring to a warm solution of 13 cc. of thionyl chloride in 75 cc. of benzene. The mixture is refluxed for about one-half hour, cooled and the crystalline hydrochloride salt of the desired product collected. After recrystallization from isopropanol the purified hydrochloride of β-chloroethyl ethyl 1-naphthylmethyl amine melts at 171–2° C.

*Example 3.—β-Bromoethyl ethyl 1-naphthylmethyl amine*

$$CH_2N(CH_2CH_3)-CH_2CH_2Br$$

A solution of 25 g. of β-hydroxyethyl ethyl 1-naphthylmethyl amine in 650 g. of constant boiling hydrobromic acid is heated under reflux for one hour. The condenser is set for distillation and the hydrobromic acid slowly distilled off until the residue has a volume of about 100 cc. The residue is cooled, diluted with acetone and the crystalline hydrobromide salt of β-bromoethyl ethyl 1-naphthylmethyl amine removed by filtration. If desired, the crude salt may be purified by recrystallization from methanol-acetone; M. P. 167–8° C.

*Example 4.—β-Chloroethyl n-propyl 1-naphthylmethyl amine*

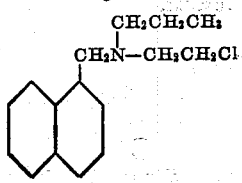

50 cc. of thionyl chloride is cooled by means of an ice bath and 25.7 g. of β-hydroxyethyl n-propyl 1-naphthylmethyl amine added dropwise with stirring. After the addition has been completed the mixture is warmed on a steam bath for fifteen minutes. When cool, the reaction mixture is diluted with about 400 cc. of dry ether and the crystalline hydrochloride of β-chloroethyl n-propyl 1-naphthylmethyl amine removed by filtration. The hydrochloride salt after purification by recrystallization from isopropanol melts at 185.5–6.5° C.

*Example 5.—β-Chloroethyl iso-propyl 1-naphthylmethyl amine*

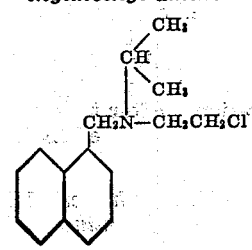

24.3 g. of β-hydroxyethyl iso-propyl 1-naphthylmethyl amine is added dropwise with stirring to 30 cc. of ice-cold thionyl chloride. After the addition has been completed, the mixture is allowed to come to room temperature slowly. The reaction mixture is then heated on a steam bath for about thirty minutes, cooled and diluted to a volume of about 400 cc. with dry ether. The crystalline hydrochloride salt of β-chloroethyl iso-propyl 1-naphthylmethyl amine is collected and purified by recrystallization from methanol-isopropanol mixture; M. P. 182–3° C.

*Example 6.—β-Chloroethyl allyl 1-naphthylmethyl amine*

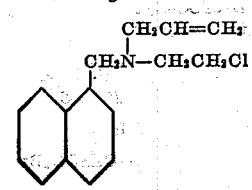

A solution of 24.1 g. of β-hydroxyethyl allyl 1-naphthylmethyl amine in 25 cc. of benzene is added dropwise with stirring to 30 cc. of thionyl chloride cooled by means of an ice bath. After the addition has been completed, the mixture is allowed to come to room temperature and then is heated on a steam bath for twenty minutes. The mixture is cooled, diluted to about 400 cc. with dry ether and the oily product which separates from solution rubbed until it crystallizes. The crystalline hydrochloride of β-chloroethyl allyl 1-naphthylmethyl amine is collected, washed with ether and purified by recrystallization from isopropanol-ether mixture; M. P. 160–3° C.

*Example 7.—β-Chloroethyl n-butyl 1-naphthylmethyl amine*

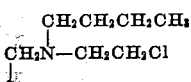

25.7 g. of β-hydroxyethyl n-butyl 1-naphthylmethyl amine dissolved in 150 cc. of benzene is added slowly to a refluxing solution of 13 cc. of thionyl chloride in 100 cc. of benzene. After the addition has been completed, the mixture is refluxed for four hours, cooled and diluted with petroleum ether. The oil which separates is rubbed until it crystallizes and the crystalline hydrochloride of β-chloroethyl n-butyl 1-naphthylmethyl amine collected. The crude hydrochloride salt can be recrystallized from isopropanol-petroleum ether mixture to obtain the pure salt melting at 145–6° C.

*Example 8.—β-Chloroethyl iso-butyl 1-naphthylmethyl amine*

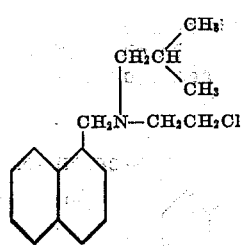

A solution of 25 g. of β-hydroxyethyl iso-butyl 1-naphthylmethyl amine in 100 cc. of benzene is added slowly to a refluxing solution of 15 cc. of thionyl chloride in 100 cc. of benzene and the resulting mixture refluxed for a total of four hours. After cooling, the crystalline hydrochloride salt of β-chloroethyl iso-butyl 1-naphthylmethyl amine is collected and purified by recrystallization from isopropanol-ether mixture.

*Example 9.—β-Chloroethyl sec.-butyl 1-naphthylmethyl amine*

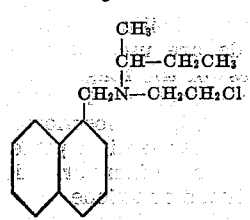

25 g. of β-hydroxyethyl sec.-butyl 1-naphthylmethyl amine is added dropwise to 50 cc. of thionyl chloride and cooled by means of an ice bath. After the addition has been completed, the mixture is allowed to come to room temperature and then it is refluxed for thirty minutes. The mixture is cooled, diluted with ether to about 500 cc. and the crystalline hydrochloride of the desired product removed by filtration. After drying the crude salt is purified by recrystallization from isopropanol-ether mixture.

Example 10.—β-Chloroethyl n-amyl 1-naphthylmethyl amine

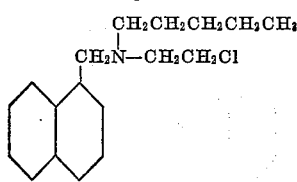

25 g. of β-hydroxyethyl n-amyl 1-naphthylmethyl amine is dissolved in 100 cc. of benzene and the resulting solution added slowly with stirring to a refluxing solution of 15 cc. of thionyl chloride in 100 cc. of benzene. The reaction mixture is stirred and refluxed for three hours and then cooled. The crystalline hydrochloride of β-chloroethyl n-amyl 1-naphthylmethyl amine is removed by filtration and purified by recrystallization from isopropanol-ether mixture.

Example 11.—β-Bromoethyl n-hexyl 1-naphthylmethyl amine

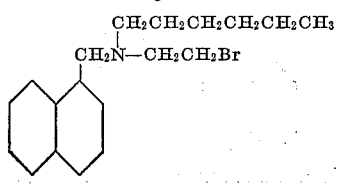

25 g. of β-hydroxyethyl n-hexyl 1-naphthylmethyl amine is mixed with 500 g. of constant boiling hydrobromic acid and the resulting solution refluxed for four hours. The condenser is set for distillation and the hydrobromic acid slowly distilled off until the residue has a volume of about 100 cc. The residue is cooled, diluted with acetone and the crystalline hydrobromide of β-bromoethyl n-hexyl 1-naphthylmethyl amine collected and purified by recrystallization from isopropanol-ether mixture.

Example 12.—β-Chloropropyl ethyl 1-naphthylmethyl amine

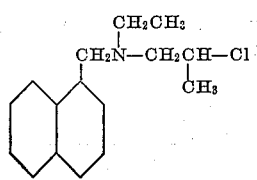

30 g. of β-hydroxypropyl ethyl 1-naphthylmethyl amine dissolved in a small amount of benzene is added dropwise with stirring to 35 cc. of thionyl chloride at ice bath temperature. After the addition is complete, the mixture is allowed to come to room temperature and then refluxed for one-half hour. After cooling, the reaction mixture is diluted to a volume of about 500 cc. with dry ether and the crystalline hydrochloride of β-chloropropyl ethyl 1-naphthylmethyl amine removed by filtration. The crude hydrochloride can be purified by recrystallization from isopropanol-ether mixture.

Example 13.—β-Chloropropyl allyl 1-naphthylmethyl amine

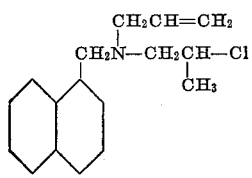

A solution of 25 g. of β-hydroxypropyl allyl 1-naphthylmethyl amine in 100 cc. of dry benzene is added dropwise to a refluxing solution of 15 cc. of thionyl chloride in 150 cc. of dry benzene and the resultant mixture refluxed for four hours. The mixture is cooled, the crystalline hydrochloride of β-chloropropyl allyl 1-naphthylmethyl amine collected and purified by recrystallization from isopropanol.

Example 14.—β-Bromopropyl iso-propyl 1-naphthylmethyl amine

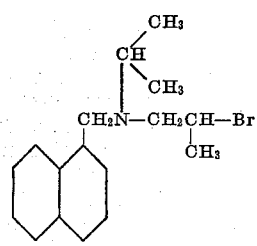

A solution of 25 g. of β-hydroxypropyl isopropyl 1-naphthylmethyl amine in 500 g. of constant boiling hydrobromic acid is heated under reflux for three hours. The condenser is set for distillation and the hydrobromic acid distilled off slowly until the residue reaches a volume of approximately 100 cc. After cooling, acetone is added to the residue to precipitate the hydrobromide salt of the desired β-bromopropyl isopropyl 1-naphthylmethyl amine. The crude salt is collected and purified by recrystallization from isopropanol-ether mixture.

While the above examples deal primarily with the production of the hydrohalide salts of the new β-haloalkyl alkyl or alkenyl 1-naphthylmethyl amines, it should be understood that the invention also includes other acid addition salts of inorganic and organic acids. Some examples of these other salts are the citrates, benzoates, acetates, oxalates, tartrates, sulfates, phosphates and the like. These salts may be prepared from the free bases of the new tertiary amines. For example, the citrate salt of β-chloroethyl methyl 1-naphthylmethyl amine, the compound of Example 1, may be prepared as follows.

25 g. of β-chloroethyl methyl 1-naphthylmethyl amine hydrochloride is dissolved in 150 cc. of water and the resulting solution made alkaline in the cold by the addition of 10% sodium hydroxide solution. The free base is extracted from the alkaline solution with ether, the combined ether extracts dried for a few minutes over anhydrous potassium carbonate and the drying agent removed by filtration. The ether solution of the free base is added to a solution of 17 g. of citric acid in 500 cc. of ether (plus a small amount of absolute ethanol to increase the solubility of the citric acid). The citrate salt which separates from the solution as a fine white powder is collected and purified by repeated washing with ether.

Other salts such as the oxalate of β-chloroethyl methyl 1-naphthylmethyl amine may be prepared by evaporation of the ether from an ether solution of the free base and adding the base to a warm solution of isopropanol containing at least one equivalent of oxalic acid. Ethyl acetate is added and on cooling the acid oxalate of β-chloroethyl methyl 1-naphthylmethyl amine crystallizes out.

In its broader aspects the invention also includes the quaternary ammonium compounds derived from the β-haloalkyl alkyl and alkenyl 1-naphthyl amines. The quaternary ammonium halides may be prepared by treating a free base of the new 1-naphthylmethyl amines with an alkyl or aralkyl halide such as methyl iodide, ethyl bromide, benzyl chloride and the like, in an inert organic solvent. The quaternary ammonium sulfonates and sulfates can be prepared in an analogous manner by using reagents such as dimethyl sulfate, methyl benzene sulfonate and methyl toluene sulfonate instead of the alkyl or aralkyl halides. Some examples of the compounds which can be prepared by these methods are β-chloropropyl dimethyl 1-naphthylmethyl ammonium iodide, β-chloroethyl ethyl methyl 1-naphthylmethyl ammonium benzene sulfonate, β-chloroethyl diethyl 1-naphthylmethyl ammonium p-toluene sulfonate, β-chloroethyl dimethyl 1-naphthylmethyl ammonium methosulfate and β-chloroethyl ethyl benzyl 1-naphthylmethyl ammonium chloride.

The substituted β-hydroxyalkyl 1-naphthylmethyl amines used as starting materials for the preparation of the new halo amines of the present invention may be prepared as described in our copending application, Serial No. 713,462, filed on even date herewith.

What we claim as our invention is:

1. A compound of the class consisting of a free base and its acid addition salts, said free base having the formula,

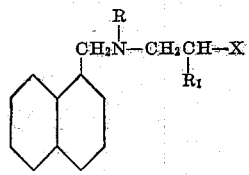

where R is a member of the class consisting of lower alkyl and lower alkenyl radicals, R₁ is a member of the class consisting of hydrogen and methyl and X is a member of the class consisting chlorine and bromine.

2. An acid addition salt of a compound having the formula,

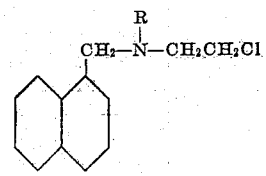

where R is a lower alkyl radical.

3. An acid addition salt of a compound having the formula,

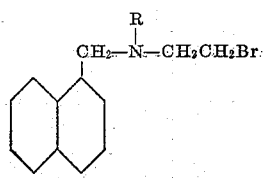

where R is a lower alkyl radical.

4. A hydrochloride salt of a compound having the formula,

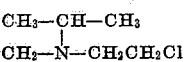
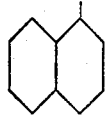

5. The compound having the formula:

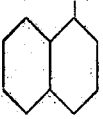
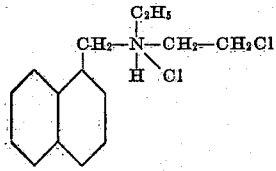

6. A compound of the class consisting of a free base and its acid addition salts, said free base having the formula,

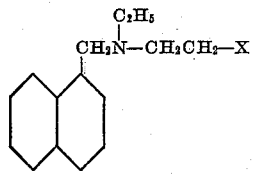

where X is a member of the class consisting of Cl and Br.

7. The compound having the formula,

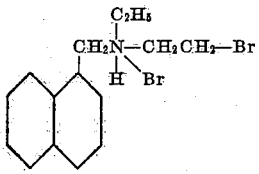

GEORGE RIEVESCHL, JR.
WILLIAM R. COLEMAN.

REFERENCES CITED

The following references are of record in the file of this patent:

UNITED STATES PATENTS

| Number | Name | Date |
|---|---|---|
| 1,949,247 | Eisleb | Feb. 27, 1934 |
| 2,072,348 | Ward | Mar. 2, 1937 |
| 2,114,122 | Bruson | Apr. 12, 1938 |

FOREIGN PATENTS

| Number | Country | Date |
|---|---|---|
| 456,534 | Great Britain | Nov. 11, 1936 |
| 131,529 | Japan | Aug. 7, 1939 |
| 204,708 | Switzerland | Sept. 1, 1939 |

OTHER REFERENCES

Wedekind: "Ann.," 471, pp. 73–112 (1929).